United States Patent Office 3,526,746
Patented Sept. 1, 1970

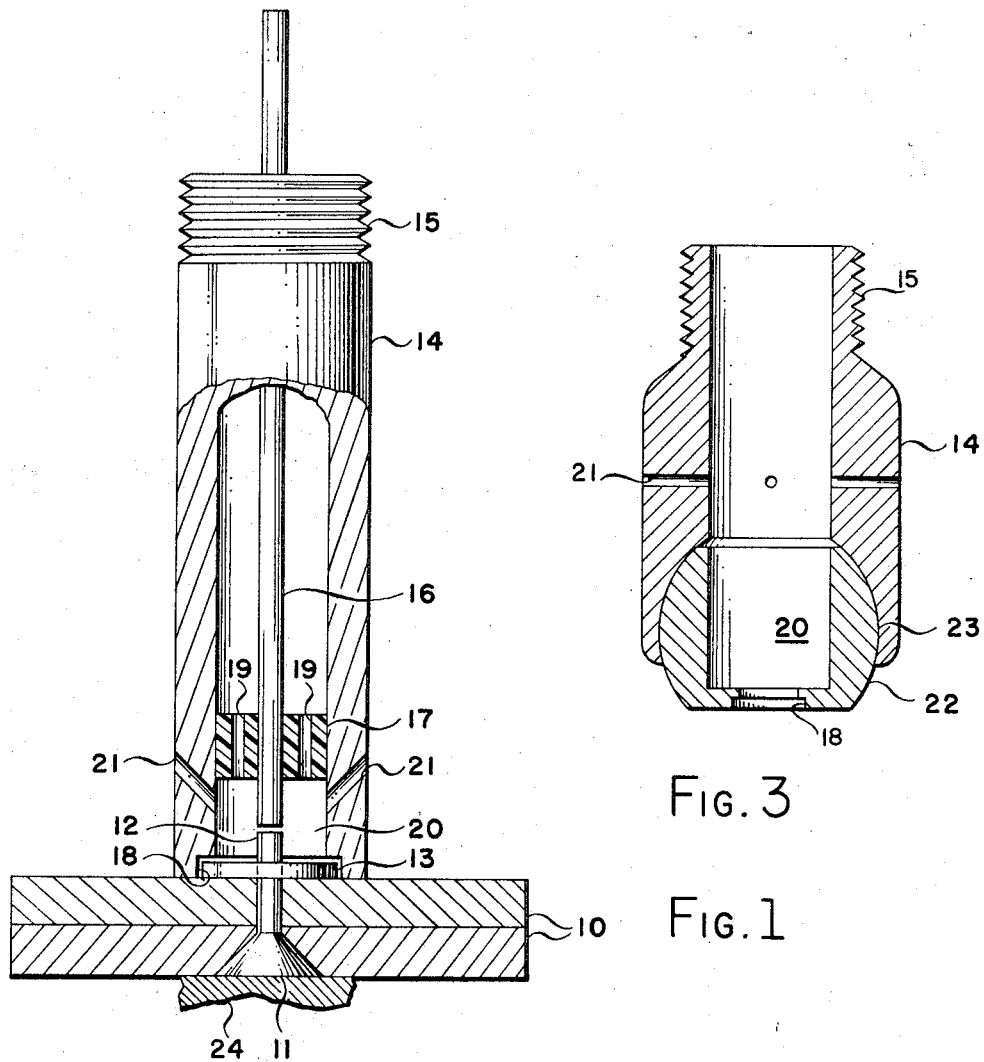

3,526,746
GAS-SHIELDED ARC-RIVETING TOOL
Alton D. Campbell, Kennesaw, Ga., assignor to Lockheed Aircraft Corporation, Burbank, Calif.
Filed Oct. 6, 1966, Ser. No. 584,831
Int. Cl. B23k 9/16
U.S. Cl. 219—127                    2 Claims

ABSTRACT OF THE DISCLOSURE

A method and means are provided to upset and secure a rivet in lieu of the conventional bucking technique. This proposed method essentially consists of placing a washer over the rivet bucktail and fusion welding the projecting end of the bucktail to the washer. The means comprises an attachment to the end of a welding gun that is formed at its outer end with means to engage and retain the washer to facilitate its installation on the rivet bucktail, and a chamber adjacent said means and internally of the attachment including means to properly position the electrode of the welding gun relative to the bucktail. Additional means is provided to give the outer end of the attachment in which the washer engaging and retention means, the chamber and the electrode positioning means are located, universal angular adjustment.

This invention relates to the art of riveting and more particularly to an improved riveting method and means having particular utility in making high performance connections, i.e., connections of maximum strengths and fatigue resistance.

Many present day installations, such as for example those involved in the manufacture of aircraft and aerospace equipment, require a higher degree of rigidity between parts to be joined than heretofore; and, among other things, tapered rivets designed to produce an interference fit of predetermined magnitude have evolved. Also, the materials employed in both the rivet and the structural parts have been selected from those having a relatively high yield strength, such as titanium, steel, etc. The result in many cases is that the riveting operation as practiced over many years has become complicated and in some instances totally ineffective.

In those high performance applications where relatively large (3/16 of an inch or more in diameter) fasteners can be employed, conventional riveting has been discarded in favor of the more reliable and certain nut-and-bolt technique. Where such fasteners cannot be tolerated or where riveting is desired or necessary, resort has been made to special rivet construction and design and other techniques to give some reasonable assurance of a proper rivet installation.

The present invention is therefore directed to an improved riveting operation that offers particular advantages in high performance installations and especially those employing relatively small rivets (less than 3/16 of an inch in diameter). At the same time, the invention lends itself to connections involving metals of relatively high yield strengths and interference fits.

To the above ends, a riveting method is herein proposed that consists essentially in the use of a washer in conjunction with the deformable end portion or bucktail of a rivet to clampingly engage the parts or sheets to be joined in opposition to the rivet head. With the washer thus disposed on the end of the rivet, the extending bucktail is upset by welding it to the washer. In this way the shank of the rivet is substantially unaffected as opposed to the conventional swelling that accompanies rivet compression or bucking, and its design and configuration are maintained. Also, proper clamping of the joined parts is effected in a controlled manner.

To facilitate this proposed method, a special attachment is herein contemplated which in essence comprises a tubular stem adapted to connect at one end to a conventional welding gun with the heating element of the gun enclosed thereby. At its other end, this stem is formed or otherwise provided with a receptacle complemental to the washer to be disposed on the rivet bucktail. The washer is thereby received in the stem and installed on the bucktail, with pressure if desired. When thus disposed, the heating element of the gun is properly located with respect to the projecting bucktail to assure a weldment of bucktail to washer upon the normal operation of the gun.

As an added feature, the washer-receiving end of the stem is universally or swivelly mounted to facilitate its continuous abutment against the washer and the washer in turn against the adjacent surface of the assembly. This also facilitates installations that are hidden or obstructed by associated parts or structure.

With the above and other objects in view as will be apparent, this invention consists in the several procedural steps as well as the combination, construction and arrangement of parts all as hereinafter more fully described, claimed and illustrated in the accompanying drawings wherein:

FIG. 1 is a side view partly in section of a stem or end attachment constructed in accordance with the teachings hereof and adapted to be immovably connected to a conventional fusion spot welding gun to show it in its operative position relative to a washer and rivet, the shank of the rivet piercing a pair of abutting sheets with the bucktail extending beyond the sheets prior to being upset whereby the sheets are rigidly joined together in a high performance connection;

FIG. 2 is a similar view of the abutting sheets and rivet subsequent to the upsetting and welding operation; and FIG. 3 is a longitudinal section of a modified end attachment showing a washer-receiving portion that is mounted for universal or swivel movement.

Referring more particularly to the drawings, 10 designates a pair of sheets of metal in which aligned fastener openings have been provided to receive a rivet 11. The deformable end or bucktail 12 of the rivet 11 projects beyond the sheets 10 and is adapted to receive a washer 13. Preferably, the washer 13 is press-fitted on the bucktail 12 and brought into abutting contact with the associated surface of the adjacent sheet 10 to act in opposition to the head of the rivet 11 in clampingly securing the sheets in a rigid assembly. The material of the washer 13 is either the same as or one that is compatible with the material of the rivet 11 to the end that upon welding, the bucktail 12 is upset and becomes fused or integral with the washer 13 so as to permanently secure the assembly.

In order to facilitate the above operation, a tubular attachment or stem 14 is provided. This stem 14 is formed or otherwise provided at one of its ends with connection means, such as for example threads 15 adapted to secure it to a conventional welding gun (not shown). When thus secured to the gun, the gun's heating element or electrode 16 extends into the stem 14 and is enclosed thereby terminating short of the outer end of the stem. One or more bushings 17 may be employed within the stem 14 to locate and maintain the electrode 16 centrally therein.

The outer end of the stem 14 is recessed as at 18 to form in effect a receptacle complemental to the washer 13 which is thereby seated therein and may be forced onto the bucktail 12 during the installation. With the stem thus disposed, the end of electrode 16 is located in substantial contact with the outer surface of the bucktail 12 whereby normal operation of the gun causes an electrical discharge sufficient to fuse the bucktail 12 causing it to weld to the washer 13.

Preferably, the particular welding gun employed is a fusion spot welding gun, a so-called TIG (a non-consumable tungsten electrode shielded by an inert gas) or what is more aptly today referred to as GTA welding (gas tungsten arc) since an inert gas is not always used. In this case, each bushing 17 is pierced by appropriate holes 19 for the passage of gas therethrough to a welding chamber 20 adjacent the outer end of the stem 14 in which the associated ends of the electrode 16 and bucktail 12 are located. In addition, the walls of the stem 14 adjacent the welding chamber 20 are provided with suitable passages 21 communicating with the chamber for the release or escape of gas therefrom.

As an added refinement, the outer end of the stem 14 in which the recess 18 is located may be in the form of a sphere or semi-sphere 22, freely and universally mounted in a socket 23 in the stem 14 so as to constitute in effect a ball joint. Thus, when the face of the stem 14 defined by the sphere 22 contacts the surface of one of the sheets 10, the abutment is continuous locating the bucktail 12 and electrode 16 in substantially axial alignment and centrally within the chamber 20 to assure a proper weldment.

In view of the foregoing construction and arrangement, it is apparent that with the sheets 10 in surface-to-surface contact, the fastener openings therein aligned and a rivet 11 seated therein, a washer 13 is readily disposed on the bucktail 12. Where the washer 13 is press-fitted on the bucktail as preferred, a bucking plate 24 may be employed to act in opposition to the stem 14 with a washer 13 in the receptacle 18. When the washer 13 is thus forced sheet 10, the electrode 16 of the welding gun is properly located with respect to the bucktail 12 so that normal operation of the gun will form a proper weldment.

While particular embodiments of the invention have been hereinabove illustrated and described, it will be apparent to those skilled in the art that many variations and modifications may be made without departing from the invention. The appended claims are intended to cover all such variations and modifications that fairly fall within the true spirit and scope of this invention.

What is claimed is:

1. A disconnectable and reconnectable attachment for a welding gun comprising:

a tubular stem having an outer end mounted for substantially universal movement on said gun and enclosing the heating element of said gun, said heating element being an electrode and said attachment including at least one bushing disposed internally of said stem locating and maintaining said electride centrally of said stem;

a receptacle in the outer end of said stem adapted to receive a washer therein when said washer is disposed on the bucktail of a rivet extending from the surface of a part in opposition to the head of said rivet;

a welding chamber within said stem adjacent said receptacle in which the end of said heating element is adapted to terminate adjacent said bucktail when said rivet is disposed as aforesaid and the outer stem end abuts said surface;

at least one hole piercing each said bushing to establish communication between the interior of said stem and said chamber across each bushing; and at least one passage piercing said stem and communicating with the interior of said chamber.

2. The attachment of claim 1 wherein said receptacle is sized to accommodate a washer having a hole with a transverse dimension substantially equal to that of said bucktail and the material of the washer is compatible with that of said rivet bucktail whereby they are capable of being welded into an integral assembly.

References Cited

UNITED STATES PATENTS

| | | |
|---|---|---|
| 2,346,088 | 4/1944 | Shobert _____ 219—119 |
| 2,516,016 | 7/1950 | Pakala _____ 219—75 X |
| 2,623,974 | 12/1952 | Prucha _____ 219—98 X |
| 3,366,773 | 1/1968 | Edge et al. _____ 219—127 |
| 1,261,327 | 4/1918 | Von Henke. |
| 2,922,023 | 1/1960 | Hackman et al. ____ 219—127 X |

JOSEPH V. TRUHE, Primary Examiner

R. F. STAUBLY, Assistant Examiner

U.S. Cl. X.R.

219—75, 119, 150, 157